United States Patent [19]

Ghandehari et al.

[11] 4,234,333
[45] Nov. 18, 1980

[54] PROCESS FOR RECOVERING METAL CARBIDE POWDER FROM CEMENTED CARBIDES

[75] Inventors: Mohammad H. Ghandehari, Salt Lake City, Utah; Mortimer Schussler, Buffalo Grove, Ill.

[73] Assignee: Fansteel, Inc., North Chicago, Ill.

[21] Appl. No.: 33,037

[22] Filed: Apr. 25, 1979

[51] Int. Cl.$^2$ .................. C22B 23/00; C25B 1/00; C25C 1/08; C25F 3/00
[52] U.S. Cl. .................. 75/0.5 BA; 204/86; 204/112; 204/105 R; 204/129.1; 204/129.75; 204/146; 75/82
[58] Field of Search ........... 204/129.1, 129.46, 129.75, 204/130, 140, 144.5, 146, 112, 123, DIG. 10, 86, 105 R; 75/82, 0.5 BA

[56] References Cited

U.S. PATENT DOCUMENTS

| | | | |
|---|---|---|---|
| 1,726,236 | 8/1929 | Parker | 204/129.75 X |
| 2,020,117 | 11/1935 | Johnston | 204/129.1 X |
| 3,669,850 | 6/1972 | Draca | 204/16 |
| 3,785,938 | 1/1974 | Sam | 204/16 |
| 4,140,597 | 2/1979 | Kobayakawa | 204/129.75 X |

*Primary Examiner*—John H. Mack
*Assistant Examiner*—D. R. Valentine
*Attorney, Agent, or Firm*—Barnes, Kisselle, Raisch & Choate

[57] ABSTRACT

A process for recovering metal carbide powders from cemented carbides containing a metal binder phase by anodic dissolution of the binder phase under controlled electrochemical potential and current density conditions to produce a greatly accelerated rate of dissolution of the binder phase without significant dissolution of the metal carbide grains.

57 Claims, 7 Drawing Figures

U.S. Patent Nov. 18, 1980 Sheet 1 of 5 4,234,333

PROCESS FOR RECOVERING METAL CARBIDE POWDER FROM CEMENTED CARBIDES

This invention relates to recovery of metal carbide from cemented carbides and more particularly to a process for selective anodic dissolution of the binder phase of cemented carbides to recover the metal carbides in powder form.

Cemented carbides include one or more refractory metal carbides or reactive metal carbides, or combinations thereof, bonded with an iron group metal, most commonly cobalt, by liquid phase sintering. For example, in a tungsten carbide-cobalt type of cemented carbide, the tungsten carbide particles are bonded by cobalt, which occurs as a film or shell surrounding many of the tungsten carbide particles to produce essentially a fully dense sintered material. While the binder phase is usually referred to as a cobalt binder, it is more properly called a "cobalt-base alloy binder," since it also contains some amount of tungsten.

Some of the cemented carbides contain a combination of several types of metal carbides, such as tungsten carbide plus titanium carbide plus tantalum carbide bonded with cobalt. Other metal carbides such as columbium carbide, molybdenum carbide, vanadium carbide, and chromiun carbide may be used as constituents in cemented carbides.

Still other cemented carbides may contain titanium carbide bonded with nickel, and may include molybdenum and molybdenum carbide as additional constituents. Still other cemented carbides may have nickel or iron substituted for a portion of the cobalt binder metal.

The composition of the cobalt binder phase was studied in detail in a two-phase tungsten carbide-10% cobalt cemented carbide as reported by H. Suzuki and H. Kubota in "The Influence of Binder Phase Composition on the Properties of WC-Co Cemented Carbides," Planseeberichte Fur Pulvermetallurgie, Bd. 14, 1966. The range of the two-phase region was between about 6.04 and 6.22% carbon in the WC phase, giving a width of the range of about 0.18% carbon. It was found that the dissolved tungsten content in solid solution in the binder phase changed sharply from a minimum of 2–3% in the high carbon (6.22%) two-phase alloy to a maximum of 9–10% in the low carbon (6.04%) two-phase alloy due to the change in carbon content of the alloy in the two-phase region. These and all other percentages stated herein refer to percent by weight unless otherwise stated.

Various processes are known for the recovery of metal carbides, and sometimes the binder phase metals as well, from cemented carbides, such as sintered tungsten carbide in which cobalt metal is used as the binder.

According to Trapp U.S. Pat. No. 2,485,175, tungsten carbide is recovered from cemented tungsten carbide by a process wherein a mass of the cemented carbide is heated to a temperature above the melting point of the cobalt bonding metal which causes the mass to swell and become porous, the porous mass is leached with acid to remove the cobalt metallic bond, and the resultant mass is subjected to mechanical reduction to produce powdered tungsten carbide. This process leaves a portion of the cobalt associated with the powdered tungsten carbide and produces grain growth of the metal carbide particles, both of which are undesirable for reuse of the recovered metal carbide powder.

Shwayder U.S. Pat. No. 3,438,730, discloses a method of disintegrating sintered hard carbide masses having a cobalt binder by immersing them in relatively weak phosphoric acid to dissolve the cobalt binder, and thereafter recovering the hard carbide particles by mechanical separation. The patent also discloses autogenously milling such masses while they are immersed in the acid. We have found that the metal carbide grains recovered by this process were reduced to an unacceptably small particle size, probably as a result of the mechanical attrition and the rate of dissolution of the binder phase was much less than the process of this invention. Furthermore, in U.S. Pat. No. 3,438,730, autogenously milling during the treatment in phosphoric acid in an atmosphere of oxygen at a pressure of about 25 psig, or the addition of an oxidizing agent such as hydrogen peroxide, is needed to achieve a viable process for commercial use. We have found that such use of an oxidizing agent substantially increases the oxygen content and severely degrades the quality of the recovered metal carbide powder.

Barnard, et al. U.S. Pat. No. 3,595,484 discloses recovery of refractory carbides from cemented carbides by treating the cemented carbide with molten zinc for a time and temperature sufficient to form an alloy of zinc and the cementing agent, and subsequently distilling the zinc from the mass. Thereafter, the mass is ground to a powder. This process requires relatively complex apparatus, and also requires removal of zinc by subsequent dissolution or distillation to obtain a mixture of the carbide and the cementing agent in a form that can be reused in preparation of cemented carbides.

Jonsson U.S. Pat. No. 3,560,199 discloses chlorination of hard metal scrap cemented carbide to recover the metals. This involves complex apparatus and the metal values are recovered in the form of metal chlorides, which require further processing to obtain metal powders or other usable forms of the metals.

Shwayder U.S. Pat. No. 3,635,674 discloses a process for separating refractory carbide particles from the nickel and/or cobalt binders in cemented refractory carbide pieces by immersing the pieces in an amine solution in a sealed vessel, introducing oxygen to the vessel under pressure, autogenously milling the pieces, and physically separating the particles from the solution, thereby dissolving the binder and leaving the carbide in particulate form. This process has the same general disadvantages as the process of U.S. Pat. No. 3,438,730.

MacInnis, et al. U.S. Pat. No. 3,887,680 discloses a process in which cemented tungsten carbide containing an iron group binder metal such as cobalt is oxidized to form a friable oxidation product which is ground and treated to recover the tungsten values by digestion of the oxidation product in an aqueous solution of an alkali metal hydroxide under controlled temperature and pressure. In this process the tungsten values are dissolved and the cobalt remains in the undissolved sludge. Thus the tungsten requires substantial further reprocessing for conversion back to tungsten carbide.

Hartline, el al. U.S. Pat. No. 3,953,194 describes a process in which cemented metal carbide material is subject to catastrophic oxidation to produce a mixture of the metal oxide and the oxide of the bonding metal, reducing the metal oxide either mixed with the bonding oxide or after being separated from it, the carburizing the reduced metal. Thus the process requires a considerable number of critically controlled oxidation, reduction, and carburization steps to attain reusable metal carbide powder.

Recovery of tungsten from high tungsten scrap by anodic dissolution of the scrap in an aqueous solution of sodium hydroxide is described by P. Ramakrishnan and S. P. Nagarkatte, "Recovery of Tungsten from Scrap", Indian J. of Technol., Vol. 4, October 1966. Subsequently the tungsten values were precipitated as tungstic acid from the sodium tungstate solution by hydrochloric acid, and tungsten powder was produced by hydrogen reduction of the recovered tungsten acid. The tungsten powder would require further processing by a carburization step to obtain tungsten carbide powder for reuse of the recovered tungsten values in producing cemented carbides.

SUMMARY OF THE INVENTION

This invention is a process for recovering for reuse metal carbide powders from pieces of cemented carbide such as various sintered carbide inserts utilized as cutting edges in tools for machining workpieces. In this invention scrap pieces of cemented carbide such as tungsten carbide with a 6% cobalt binder are subjected to electrochemical dissolution of the binder in an acidic electrolyte under controlled conditions so that the binder is dissolved without significant dissolution of the tungsten carbide.

In the preferred form of the process this dissolution produces pieces with an outer layer or skeleton of relatively loosely bound particles of tungsten carbide, from which the binder has been dissolved, surrounding a core of tungsten carbide particles still cemented together by the binder. The relatively loosely bound particles of tungsten carbide can be readily broken away from the core by ball milling to recover tungsten carbide powder which with further processing is suitable for reuse in producing cemented tungsten carbide. The cores are repeatedly subjected to further electrochemical dissolution of the binder and removal of loosely bound tungsten carbide particles until the pieces of cemented carbide are completely disintegrated.

The electrolyte is selected and the applied electrode potential or applied current is controlled so that the binder is electrochemically dissolved in the electrolyte without any significant dissolution of the tungsten carbide particles with the rate of dissolution being increased in a range of about 4 to 20 times over that obtained in the absence of an electrolytic current under otherwise essentially the same conditions. Preferably, the electrochemical dissolution is performed in an inert atmosphere such as nitrogen and without an oxidizing agent in the electrolyte to both increase the rate of dissolution of the binder and produce a lower oxygen content in the recovered metal carbide powder.

The recovered metal carbide powder is usually collected, washed to remove any deleterious contaminants, treated to reduce its oxygen content and adjust its carbon content, and graded and blended. This produces a reclaimed tungsten carbide metal powder suitable for use in making sintered tungsten carbide pieces for use as cutting inserts in tooling and the like.

Preferably, the dissolved cobalt and tungsten from the binder remains in solution in the electrolyte so that the electrolyte and the metal carbide particles or grains can be readily separated to recover metal carbide grains which are essentially free of binder constituents. Subsequently, the cobalt and tungsten may be recovered from the electrolyte. However, in some embodiments of the invention, after the binder has been dissolved in the electrolyte it may be precipitated onto the metal carbide grains so that the metal carbide powder is recovered with the binder thereon.

Objects, features and advantages of this invention are to provide a process for recovery for reuse of metal carbide powder from cemented carbide which produces carbide powders with physical and chemical characteristics similar to their original presintered characteristics and with high yield for reuse in making cemented carbides, achieves greatly accelerated rates of selectively removing the binder from cemented carbide pieces without significantly attacking or altering the metal carbide grains, and is economic and easily carried out on a commercial scale.

These and other objects, features and advantages of this invention will be apparent to those skilled in the art from the following detailed description, appended claims and accompanying drawings in which:

Figure 1:
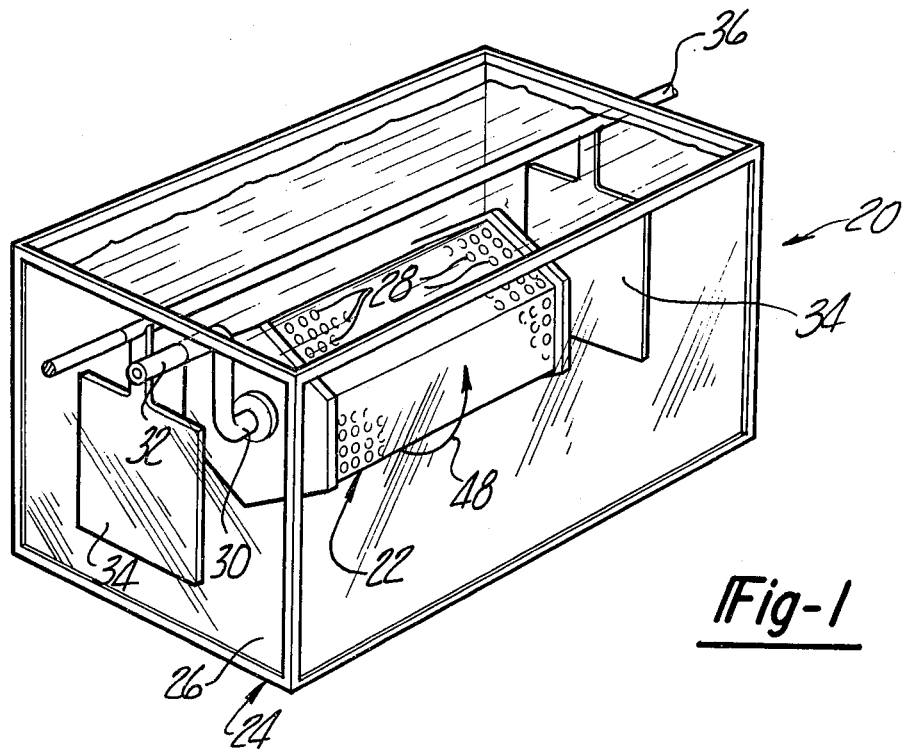
FIG. 1 is a semi-schematic perspective view of a barrel type of apparatus for electrochemical dissolution of cemented carbides in accordance with this invention.
Figure 2:
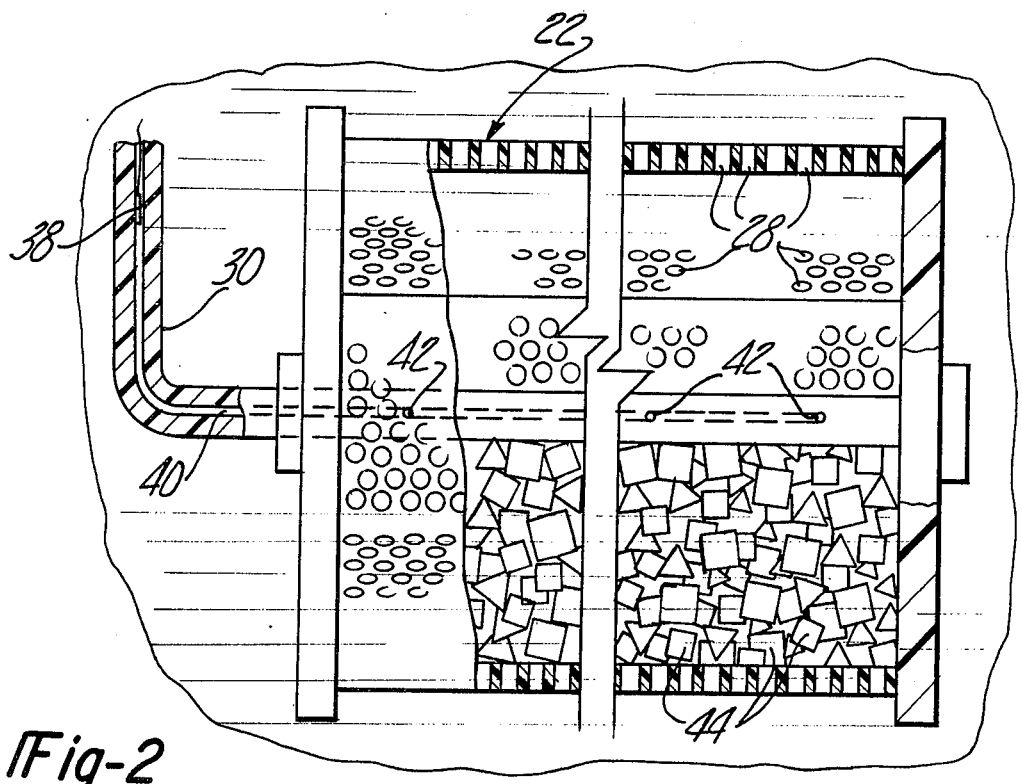
FIG. 2 is an enlarged sectional view of the barrel of the apparatus of FIG. 1.

The preferred embodiment of this invention is described as applied to the recovery of tungsten carbide powder from pieces of cemented tungsten carbide with a cobalt binder phase even though the preferred embodiment may be applied to the recovery of other metal carbide powders from pieces of cemented carbides thereof with binder phases of iron group metals other than cobalt. In accordance with this invention the electrochemical dissolution of the binder phase of cemented carbide pieces may be carried out in a leaching apparatus 20 illustrated semi-schematically in FIGS. 1 and 2 in which a barrel 22 is rotatably mounted in an outer tank 24 in which an electrolyte 26 is received. Barrel 22 has perforations 28 in its side wall and a rod like anode 30 extending generally axially therethrough which is connected to a copper bus bar 32. Barrel 22 and tank 24 should be resistant to corrosion and may be constructed of materials such as polyethylene.

Cathodes in the form of generally flat plates 34 are mounted within tank 24 adjacent opposed ends and are electrically connected to a copper bus bar 36. The anode and cathodes must be electrically conductive and preferably resistant to corrosion, and in practice anodes and cathodes of type 304 stainless steel have proved to be satisfactory. To permit monitoring of the potential of the anode current a saturated calomel reference electrode 38 is provided which communicates through passage 40 and holes 42 in the anode with the electrolyte 26 received in the apparatus.

In use of apparatus 20, barrel 22 is filled with cemented carbide pieces 44 to at least one-half and preferably about three-fourths of the volumetric capacity of the barrel. The barrel must contain at least sufficient carbide pieces 44 so that they will make contact with the anode 30 and preferably have sufficient free space in the barrel to permit gentle and continuous tumbling of the carbide pieces in the electrolyte during electrolytic dissolution by rotation of the barrel. The tank 24 is filled with electrolyte 26 to a level 46 sufficient to submerge the carbide pieces when they are being tumbled in the barrel.

This continuous tumbling of the pieces provides a more uniform distribution of current throughout the pieces to produce a more uniform attack of the binder phase and decrease the likelihood of any significant dissolution of the tungsten carbide grains of the pieces. Preferably, the barrel is rotated as indicated by the arrow 48 at a relatively slow speed on the order of about five to fifteen r.p.m. although the barrel may be rotated at a somewhat slower or faster rate. However, severe mechanical agitation of the tungsten carbide pieces while they are submerged in the electrolyte in apparatus 20 should be avoided so that substantial quantities of ultrafine metal carbide particles will not be produced which would degrade the quality of the reclaimed metal carbide powder produced by this process.

Preferably, when loaded into barrel 22 the maximum dimension of the cemented carbide pieces is not greater than about $1\frac{1}{2}$ inches and the majority of the pieces have maximum lineal dimensions ranging from about $\frac{1}{4}$ to $\frac{3}{4}$ of an inch. Prior to loading the pieces they are preferably washed by tumbling in water or other suitable solvent to remove any foreign materials such as graphite dust or other substances adhered to the surface. It also is necessary to remove any brazing alloy on the pieces, if present, by suitable known acid treatments.

Contrary to the teachings of the prior art, higher rates of dissolution of the binder phase were obtained when electrochemical dissolution was carried out without any oxidizing agent in the electrolyte and without any oxygen present. An increase in dissolution rate also should be obtained when electrolytic dissolution is carried out in apparatus 20 in an inert atmosphere such as nitrogen, argon, or helium. No significant difference in the rate of dissolution of the binder phase of the cemented carbide has been found when the temperature of the electrolyte is in the range of about 25° C. to 60° C. If desired, suitable means for heating or cooling the electrolyte to maintain its temperature within this range may be provided.

The potential and strength or amperage of direct current applied to apparatus 20 for electrochemical dissolution is selected to maximize the rate of dissolution of the binder phase of the cemented carbide pieces without producing any significant dissolution of the metal carbide grains of the pieces. The manner of determining the potential and amperage of the direct current to be supplied to bus bars 32 and 36 utilizing either a constant potential or a constant current power source for a specific dissolution apparatus 20, composition and size of carbide pieces, and electrolyte is set forth hereinafter.

As electrochemical dissolution of the binder phase of cemented tungsten carbide pieces proceeds in apparatus 20, some of the grains of the tungsten carbide from which the binder phase has been dissolved separate from the pieces and eventually pass through the holes 28 in the barrel 22 and settle in the bottom of the tank 24. However, because there is some bonding or skeletal strength between the metal carbide grains even after the binder phase has been dissolved, most of the tungsten carbide grains from which the binder has been dissolved remain together as a porous outer skeleton or layer surrounding the core of the pieces of cemented carbide. As this cobalt depleted skeleton or layer becomes thicker the rate of dissolution of the binder phase of the cemented carbide pieces decreases and hence after a period of time of electrochemical dissolution, usually in the range of about 18 to 30 hours and preferably about 24 hours, the cemented carbide pieces are removed from the apparatus 20 for separation of the outer skeleton or layer from the core of the partially leached pieces of cemented carbide.

The rather brittle skeleton or outer layer of binder depleted tungsten carbide grains is separated from the core by ball milling or tumbling such as in a cement mixer the partially leached pieces of cemented carbide under distilled or deionized water. Typically, the partially leached pieces are milled or tumbled for about 18 to 36 hours and preferably about 24 hours with the separated grains of metal carbide powder being removed from the mill about every four to ten and preferably every six to eight hours to avoid over milling thereof which would produce a powder with too many ultrafine grains of tungsten carbide. After milling for 18 to 36 hours the remaining cemented carbide cores are returned along with additional cemented carbide pieces to the apparatus 20 and the electrochemical dissolution and milling steps are repeated until the cores of the partially leached pieces are completely disintegrated.

The resulting tungsten carbide powder from both the bottom of tank 24 of apparatus 20 and the ball mill is collected such as by centrifuging the slurry of water and powder, washed to remove contaminants, and dried. To remove contaminants such as phosphates the powder may be washed in a dilute acid solution such as 1% nitric acid followed by 4 or 5 rinsings in deionized or distilled water. The powder may be dried for several hours at about 70° C. in trays in a drying oven. The dry powder has a cake-like consistency which may be broken up into a fine powder by crushing, and rototapping through a 70 mesh screen. With this process there is an overall recovery of about 95-97% of the grains of metal carbide from cemented carbide pieces.

It is usually desirable to decrease the oxygen content and adjust the carbon content of the recovered tungsten carbide powder. This may be accomplished by heating in a batch type furance the powder in graphite boats for four to six hours at about 800° to 1000° C. in a flowing hydrogen atmosphere containing a hydrocarbon gas such as a mixture of about 99% hydrogen and 1% methane to reduce the oxygen content to less than 0.25% and adjust the carbon content to essentially the theoretical stoichiometric amount of 6.13% carbon. The atmosphere may flow through the furnace at the rate of about 60 cfh per 20 kg boat of tungsten carbide powder. The treated carbide powder can then be classified and blended to provide reclaimed metal carbide powder for reuse in producing cemented carbides.

In carrying out the process of this invention an electrolyte is utilized which includes a corrosive agent which in the absence of an applied electrolytic current will preferentially attack or corrode the binder phase of the cemented carbide pieces while having little or no effect on the metal carbide grains of the cemented pieces. Since the binder phase of a cemented carbide such as WC-6%Co contains in addition to cobalt, tungsten and often small amounts of other metals dissolved in solid solution in the binder phase, the electrolyte must also be capable of dissolving and retaining in solution the ions of all of the metals that are in the binder phase of the tungsten carbide pieces. Preferably, the corrosive agent of the electrolyte will retain the binder phase in soluble form while the metal carbide grains are separated from the electrolyte to permit recovery of metal carbide grains which are essentially free from the binder phase metals.

Electrolytes which meet these requirements and can be used in carrying out the process of this invention include phosphoric acid, acetic acid plus a soluble acetate salt, citric acid plus a soluble citrate salt, tartaric acid, carbonate and borate solutions, hydrochloric acid, and sulfuric acid. Preferably, the electrolytes are relatively dilute solutions on the order of about 2 to 20% concentration by weight of a weak acid, such as phosphoric acid and buffered acetic acid.

Electrolytes which dissolve the binder phase and then reprecipitate the dissolved binder phase as a salt onto the metal carbide grains may also be used. Such electrolytes may include oxalic acid, and carbonates such as carbonic acid, sodium carbonate, and sodium bicarbonate. Of such electrolytes oxalic acid is preferred for preferentially dissolving a cobalt binder phase which may be subsequently precipitated as a cobalt oxalate.

When a phosphoric acid electrolyte is used to dissolve the binder phase of WC-Co cemented carbide, cobalt phosphate and phosphotunstic acid are formed, both of which are soluble in a phosphoric acid electrolyte. After the electrolyte has been used in apparatus 20 for several dissolution runs the concentration of cobalt in the electrolyte increases to about 12 grams per liter and should be removed from the electrolyte from the best operation of the dissolution apparatus 20. This often occurs after about ten to fifteen dissolution runs of about 24 hours each when the ratio by weight of carbide pieces to electrolyte is about 1:13.

Cobalt may be removed from the electrolyte by mixing it with oxalic acid in a stoichiometric amount in relation to the cobalt present in the electrolyte so that the cobalt is precipitated as cobalt oxalate. The cobalt oxalate may be recovered by filtration and then washed in deionized or distilled water and dried. The dry cobalt oxalate may be converted to cobalt metal powder by reduction in a furnace at a temperature of at least 600° C., and preferably at least 700° C., in a hydrogen reducing atmosphere. The electrolyte with the cobalt removed may be returned to and reused in dissolution apparatus 20.

In removing or recovering the cobalt from the electrolyte, either ammonium carbonate or sodium carbonate may be used as a precipitating agent in lieu of oxalic acid. However, when the cobalt is precipitated as cobalt carbonate the pH of the electrolyte is increased up to about pH 5 for complete precipitation. This increase in the pH of the recovered electrolyte necessitates adding more phosphoric acid to lower the pH value of the electrolyte if it is reused in the dissolution process.

After the phosphoric acid electrolyte has been reused for several additional dissolution runs the tungsten content of the electrolyte increases to a concentration of about 10 grams per liter and significant depletion of the electrolyte occurs. This often happens after a total of about 45 to 60 dissolution runs for a period of about 24 hours each when the ratio by weight of carbide pieces to electrolyte is about 1:13. The tungsten and phosphate ions can be removed from the depleted electrolyte solution and the remainder of the solution disposed of. Essentially all of the phosphate ions ($PO_4^{-3}$) may be removed from the depleted electrolyte by first adding sufficient ammonium hydroxide to increase the pH value of the electrolyte to about 9.5 and then adding sufficient magnesium chloride to precipitate essentially all of the phosphate ions as magnesium ammonium phosphate. This precipitate can be removed from the electrolyte solution by filtration and recovered by washing and drying. Thereafter, the tungsten may be removed from the depleted electrolyte by adding a stoichiometric amount of hot hydrochloric acid containing about 2% nitric acid to precipitate tungsten from the electrolyte as tungstic acid. The tungstic acid precipitate can be recovered from the depleted electrolyte by filtration and then washed in deionized or distilled water and dried. The dried tungstic acid precipitate can be converted to other forms of tungsten such as metallic tungsten powder by reduction of the precipitate at a temperature in the range of about 800° to 1000° C. in a hydrogen reducing atmosphere, Alternatively, the tungsten metal ions may be recovered from the spent electrolyte by utilizing previously known ion exchange techniques. The remainder of the depleted electrolyte solution may safely be disposed of by discharging it into a sewer, stream or the like.

It is presently preferred to use as an electrolyte an aqueous solution of about 10% by weight acetic acid plus about 0.5% by weight of a soluble salt such as sodium acetate for the purpose of obtaining adequate conductivity. However, other acetate salts such as ammonium acetate and potassium acetate may be used in lieu of sodium acetate to obtain adequate conductivity. When ammonium acetate is used, it can be added as a salt or it can be produced in-situ by adding ammonium hydroxide to produce ammonium acetate by a reaction with a portion of the acetic acid. When an acetic acid electrolyte is used in the dissolution of the binder of a WC-Co cemented carbide and the content of cobalt in the electrolyte becomes too great, the cobalt may be removed by several methods. One way of removing the cobalt is by adding sufficient oxalic acid to precipitate the cobalt as cobalt oxalate which may be reduced to metallic cobalt as described above in connection with the phosphoric acid electrolyte.

It has been found that after the acetic acid electrolyte has been used for several dissolution runs of the cobalt binder in WC-Co cemented carbide, the concentration of cobalt in the electrolyte becomes great enough that the cobalt begins to electroplate onto the cathodes 34 of apparatus 20 and thereafter this electroplating reaction continues to occur at about the same rate as the rate of dissolution of the binder phase. This usually begins to occur after about 8 to 12 runs of about 24 hours each when the ratio by weight of carbide pieces to electrolyte is about 1:13. Furthermore, it was found that the tungsten which dissolved in the electrolyte co-deposited along with the cobalt so that a cobalt-tungsten alloy was electroplated onto the cathode. Hence, both the cobalt and the tungsten may be removed from acetic acid electrolytes by electrodeposition on a cathode in either the dissolution apparatus 20 or in a separate operation outside of the dissolution apparatus. For example, analysis of a typical electroplated deposit on a cathode from an acetic acid electrolyte has a composition of essentially 94% metallic cobalt and 6% metallic tungsten. After removal from the depleted electrolyte of the cobalt and tungsten the residue is essentially an aqueous acetic acid mixture which may be treated with an alkaline solution such as sodium hydroxide to decrease its pH value to about 7, and thereafter safely discharged into a sewer or stream of water without further processing.

An oxalic acid electrolyte may be used and results in electrochemical dissolution rates for WC-Co cemented carbides which are believed to be somewhat less than those experienced with phosphoric and acetic acid electrolytes. However, when an oxalic acid electrolyte is used, precipitation of cobalt oxalate occurs which settles in the bottom of the tank of apparatus 20 along with the tungsten carbide powder that separates from the cemented carbide pieces during the electrochemical dissolution run. This mixture of cobalt oxalate and tungsten carbide can be collected, washed and dried, mixed further, if desired, with additional cobalt oxalate or tungsten carbide, depending on the final ratios desired, and then reduced to a cobalt metal plus tungsten carbide powder mixture in a specific ratio by heating to a temperaure of about 800° to 1000° C. in a hydrogen plus hydrocarbon atmosphere as previously described. Such mixed powder can be used readily and appropriately in producing cemented carbides.

The electrode potential of the current supplied to apparatus 20 for electrochemical dissolution of the binder phase in cemented carbide pieces should be selected to maximize the rate of dissolution of the binder phase of the pieces of cemented carbide without producing any significant dissolution of metal carbide grains of such pieces. The electrode potential at which significant dissolution of the metal carbide grains occurs differ sufficiently from the electrode potential at which significant dissolution of the binder phase occurs so that operating potentials can be selected which will result in rapid electrochemical dissolution of the binder phase without significant dissolution of the metal carbides of the pieces.

Figure 3:
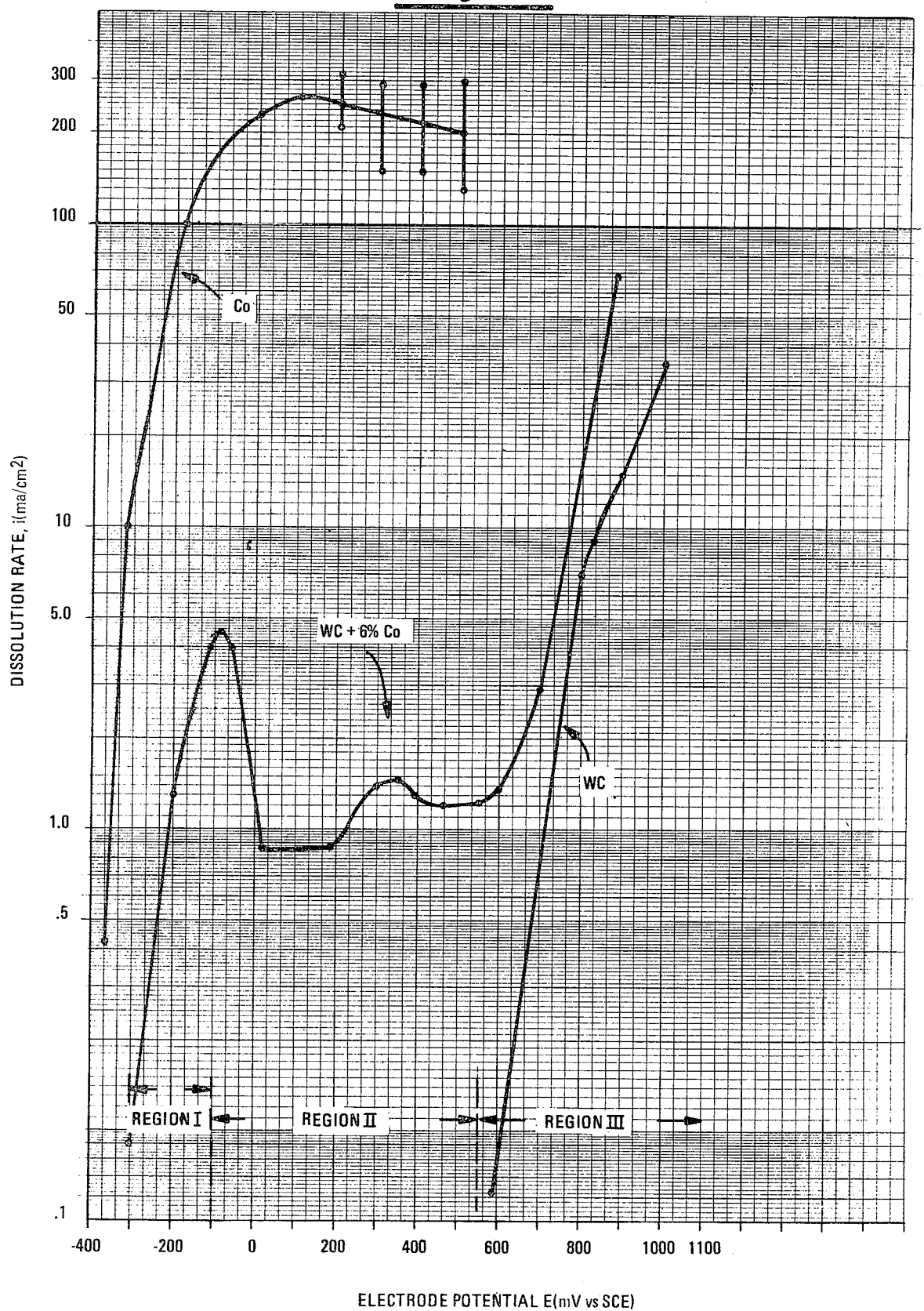
FIG. 3 is a plot of dissolution rate versus applied potential for a one cm$^2$ area of a cobalt anode, a WC-6%Co anode, and a tungsten carbide anode in nitrogen saturated 1.2 M phosphoric acid at 25° C.

As may be seen from FIG. 3, the rates of electrochemical dissolution (expressed in current density) in a 1.2 M phosphoric acid electrolyte for an anode of cemented tungsten carbide with a 6% cobalt binder increase with increasingly positive potentials and dissolution of the tungsten carbide anode begins to occur at a significantly greater electrode potential than does the dissolution of the cobalt anode. The applied potentials are expressed with respect to a saturated calomel electrode (SCE). It has been found that in the cemented tungsten carbide anode the rate of electrochemical dissolution of the binder phase increases with positive increases in potential in region I of FIG. 3, the rate of dissolution of the binder phase decreases with a further increase in the positive potential in region II of FIG. 3, and the rate of dissolution of the grains of tungsten carbide increases with a further increase in positive potential in region III of FIG. 3.

The data of the graph of FIG. 3 was obtained by placing an anode of the material to be dissolved and a cathode of a platinum wire in a cell containing about 200 milliliters of an electrolyte containing about 1.2 M phosphoric acid prepared from reagent grade phosphoric acid and deionized water at an ambient temperature of 25°±1° C. The electrode of the material to be dissolved had an exposed square area of one centimeter by one centimeter and the potential applied to the cell was measured with respect to a saturated calomel electrode (SCE) positioned outside of the cell and connected to the electrolyte. The cell was equipped with a magnetic stirring bar for agitation of the electrolyte and was purged with nitrogen.

The electrode potential of the anode was controlled by a Wenking potentiostat and the electrode currents associated with each potential recorded with a Kiethly electrometer. The surface of the anode was polished in order to eliminate any effect due to surface roughness and have a uniform surface area for the anode of each material. Open circuit potentials in the absence of any current were approximately −350 mV. relative to the SCE for cobalt and +250 mV. relative to the SCE for tungsten carbide.

In carrying out selective dissolution of the binder phase of a plurality of cemented carbide pieces received in the barrel of apparatus 20 and immersed in a particular electrolyte, the appropriate potential to be applied to apparatus 20 for the maximum rate of electrochemical dissolution of the binder phase without significant dissolution of the metal carbide grains of the pieces depends on a variety of factors including the particular electrolyte, the composition and size or surface area of the particular cemented carbide pieces, the IR drop produced by the construction of the cell and the resistance of the cemented carbide pieces when being tumbled in the cell, and various other factors. However, in practice under a given set of conditions electrochemical dissolution can be carried out in apparatus 20 under conditions sufficiently close to the maximum potential of region I of FIG. 3 by supplying current to apparatus 20 throughout the dissolution of a particular charge in the barrel of cemented carbide scrap with a power supply operating at a constant potential, the value of which corresponds to the potential at which the first peak in the current applied to apparatus 20 occurs when at the beginning of the operation of apparatus 20 the potential is increased from a value which is sufficiently negative that little, if any, dissolution of the binder phase would occur.

EXAMPLE 1

For example, the data of Table I includes the magnitude in amperes of the first peak in the current and the potential at which such peak occurred as determined by this procedure at the start of each of several dissolution runs of apparatus 20. This potential is equal to the constant potential at which the potentiostat power supply was operated to supply current to apparatus 20 throughout the 23 hour period of the dissolution run. Table I also sets forth the rate of disintegration, the percent of cobalt and tungsten leached from the cemented carbide pieces, and the percent of the metallic tungsten carbide grains recovered for each of fifteen runs on 5 kg. loads of various size pieces of cemented tungsten carbide having a nominally 6% cobalt binder when electrochemical dissolution was carried out in apparatus 20 in accordance with the preferred process of this invention.

TABLE I

Electrochemical Dissolution Data on WC-Co Under Controlled Potential and an Electrolyte of 1.2 M $H_3PO_4$ at 50–60° C.

| Exp. No. | Initial Current Conditions | | Initial Weight of Cemented Carbide, kg | Disintegration per day, % | Cobalt Leached, % | Tungsten Leached, % | Tungsten Carbide Recovered, %** |
|---|---|---|---|---|---|---|---|
| | Constant Potential* | Peak Current | | | | | |
| 1-1 | +150 mV | 5.8A | 5.0 | | | | |
| 1-2 | NR | | 5.0 | 26.0 (avg.) | 4.2 | 0.4 | 97.4 |
| 1-3 | NR | | 5.0 | | | | |
| 1-4 | NR | | 5.0 | | | | |
| 1-5 | NR | | 5.0 | | | | |
| 1-6 | NR | | 5.0 | 28.3 (avg.) | 3.5 | .35 | 98.4 |
| 1-7 | NR | | 5.0 | | | | |
| 1-8 | NR | | 5.0 | | | | |
| 1-9 | NR | | 5.0 | 17.0 (avg.) | 5.9 | .3 | 94.9 |
| 1-10 | NR | | 5.0 | | | | |
| 1-11 | −60 mV | 6.5A | 5.0 | | | | |
| 1-12 | −120 mV | 6.8A | 5.0 | 24.4 (avg.) | 4.7 | .5 | 97.3 |
| 1-13 | +80 mV | 6.5A | 5.0 | | | | |
| 1-14 | +50 mV | 4.8A | 5.0 | 24.4 | 5.6 | .39 | 95.7 |
| 1-15 | NR | | 5.0 | 23.8 | 6.8 | .57 | |
| Total runs 15 | | | | | | | 97.0 avg. |

*Constant potential relative to saturated calomel reference electrode 38.
**Based on 94% WC contained in the WC-6% Co pieces.
NR - not recorded.

This data indicates that electrochemical dissolution in a 1.2 M $H_3PO_4$ electrolyte solution at 50°–60° C. for 23 hours in apparatus 20 selectively attacks principally only the binder phase of the sintered tungsten carbide pieces. The percentage of cobalt in solution corresponds well to that of the typical cobalt content of sintered tungsten carbide with a nominal 6% cobalt binder and the substantially less than 1% of dissolved tungsten demonostrates that nearly all of the dissolved tungsten came from the binder phase with little, if any, dissolution of tungsten from the grains of tungsten carbide of the pieces.

After 23 hours in apparatus 20 the pieces of cemented carbide were removed, placed in a ball mill and milled for ≧ hours under distilled water to remove most of the grains of tungsten carbide from which the binder had been dissolved. To avoid over milling of the released tungsten carbide the ball mill was dumped every six to eight hours during the 24 hour milling period, the released particles were removed and the remainder of the partially leached pieces were returned to the ball mill. After completion of the 24 hour period of ball milling for removal of the released grains of tungsten carbide, the remainder of the partially leached pieces of cemented tungsten carbide was subjected to further dissolution of the binder in subsequent runs of apparatus 20.

To demonstrate that electrochemical dissolution results in a substantially greater rate of disintegration essentially the same steps of the process as described above in this Example 1 were carried out with essentially the same size of nominally WC-6%Co cemented carbide pieces in a solution of 1.2 M $H_3PO_4$ maintained at 55° to 60° C. except that no potential and no current were impressed on the electrodes of apparatus 20. The results of these runs are set forth in Table II.

TABLE II

Disintegration Rates of WC-6% Co Cemented Carbide Pieces in Barrel-Type Apparatus Without Applied Potential and Without or With Rotation

| Exp. No. | Cemented Carbide, kg | Barrel Rotational Speed, rpm | Current, Amps | Disintegration per day, % | Cobalt Dissolved, % | Tungsten Dissolved, % |
|---|---|---|---|---|---|---|
| 1-16 | 4 | 0 | 0 | 4.9 | 5.9 | 0.64 |
| 1-17 | 4 | 10 | 0 | 4.7 | 4.2 | .33 |

In each of two runs the cemented carbide pieces were immersed in the phosphoric acid solution for twenty-four hours, no potential was impressed, no current was passed, and in run 1-16 the barrel was not rotated while in run 1-17 the barrel was rotated at 10 r.p.m. Comparison of the results of these runs with those set forth in Table I shows that the disintegration rate with an applied constant potential is increased more than four times that of the rate when no potential is applied, even when the barrel is rotated.

The electrochemical dissolution of the binder phase of cemented tungsten carbide pieces may also be accomplished by operating apparatus 20 with a power supply operating at a constant current rather than a constant potential. The strength or amperage of the constant current at which the power supply should be operated to provide the maximum rate of dissolution of the binder phase of cemented carbide pieces without significant dissolution of the metal carbide grains of the pieces may be empirically determined by an iterative procedure. In this iterative procedure the affect on the rate of dissolution of the binder phase and the metal carbide grains of the amperage of the current is determined in sequential runs, first using an approximation of the desired amperage of the current and then a constant current at an amperage differing by a known increment from such first approximation. Based on this data the amperage of the constant current can be increased or decreased in known increments in subsequent dissolution runs to determine the amperage of the constant current which maximizes the rate of binder phase dissolution without producing significant dissolution on the metal carbide grains of the cemented carbide pieces.

Figure 4:
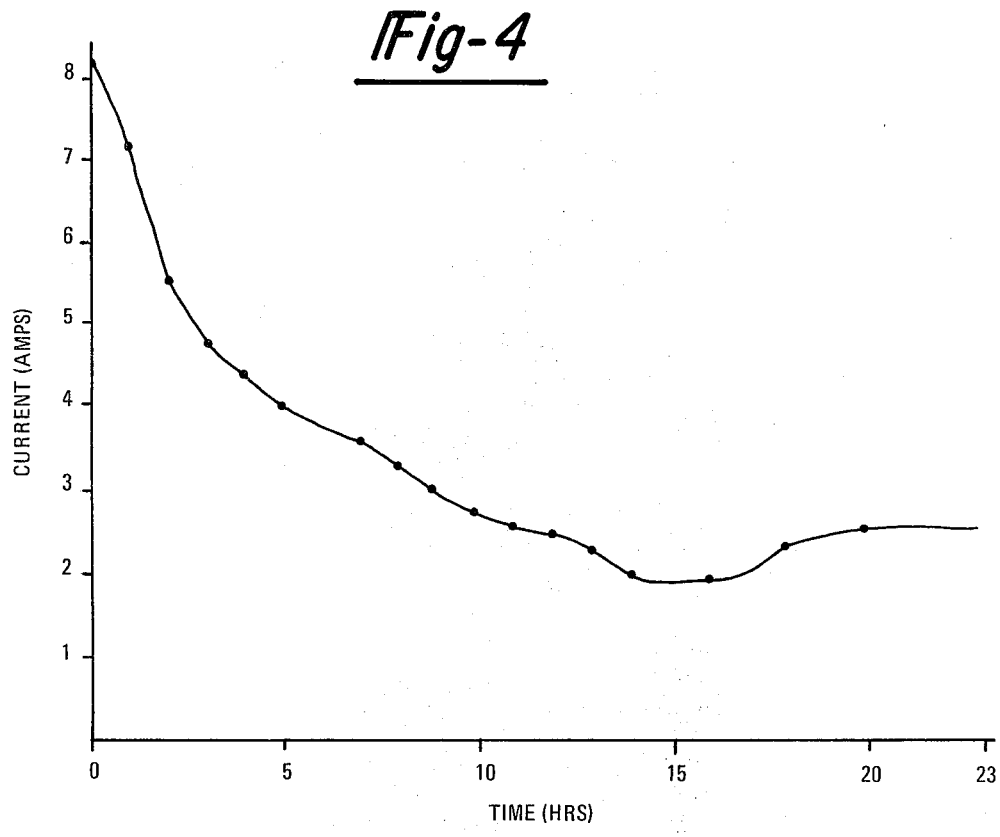
FIG. 4 is a plot of current versus time for electrochemical dissolution of WC-Co pieces at a constant applied potential in nitrogen saturated 1.2 M phosphoric acid at 50° C.

A first approximation of the amperage of the constant current at which a power supply should be operated for a particular dissolution apparatus with a particular electrolyte and composition and size of cemented carbides may be determined by first operating the cell with a constant potential power supply for 24 hours as previously described in Example 1 while recording a plot of the current as a function of time and then integrating the area under the curve to determine an average constant current per kg. of pieces to be applied in subsequent dissolution runs with carbide pieces of approximately the same composition and size. For example, FIG. 4 shows a typical plot of the current load in amperes and lapsed time in hours for 5 kg. loads of cemented WC-6% Co pieces run at a constant potential for 23 hours in accordance with Example 1. Integrating the area under the curve of FIG. 4 gives 76 ampere-hours which is equivalent to an average constant current of about 0.66 amperes per hour per kg. of cemented carbide pieces. This average constant current may be used as the first approximation of the desired constant current in the above iterative procedure for determining the magnitude or amperage of the constant current for electrochemical dissolution.

EXAMPLE 2

Data from three dissolution runs in apparatus 20 with a constant applied current of 3 amperes which was passed for 24 hours through four and five kg. lots of nominally WC-6% Co cemented carbide pieces ranging in size from about one-quarter of an inch to three-quarters of an inch using an electrolyte of 1.2 M $H_3PO_4$ at 60° C. is set forth in Table III.

TABLE III

Electrochemical Dissolution Experiments on WC-6% Co in Barrel Using Constant Current and Electrolyte of 1.2 M $H_3PO_4$ at 60° C.

| Exp. No. | Weight of Cemented Carbide, kg | Initial Applied Current, amps | Disintegration per day, % | Cobalt Leached, % | Tungsten Leached, % | Tungsten Carbide Recovery, %* |
|---|---|---|---|---|---|---|
| 2-1 | 5 | 3 | 26.2 | 5.0 | 1.1 | 97.2 |
| 2-2 | 4 | 3 | 30.75 | 5.7 | .54 | 94.1 |
| 2-3 | 5 | 3 | 23.0 | 6.3 | 1.30 | 97.6 |
| Total runs 3 | | | 27.7 avg. | | | 96.3 avg. |

*Based on assumed 94% WC in the nominal WC-6% Co pieces.

These data demonstrate that operation of apparatus 20 with a constant current in the range of 0.60 to 0.75 amperes per kg. of cemented carbide pieces produces selective electrochemical dissolution of the cobalt binder phase of cemented tungsten carbide pieces and results in an excellent recovery of tungsten carbide grains similar to that observed when operating under constant potential conditions as in Example 1. A comparison of the data of run 2-2 with that of runs 2-1 and 2-3 also indicates that in accordance with the above iterative procedure runs with an even greater magnitude of applied current of perhaps 1.0 ampere per kg. of cemented carbide pieces could be made, and the affect thereof on disintegration rate and cobalt leached can be determined in order to ascertain if the maximum rate of selective dissolution of the binder phase of the cemented carbide phase is being achieved.

EXAMPLE 3

Once the constant current to be applied to a particular apparatus 20 has been determined for a particular quantity, size and composition of carbide pieces, the size of the apparatus and the magnitude of the applied constant current may be scaled up for the processing of a larger quantity of carbide pieces of similar size and composition. For example, apparatus 20 can be scaled up in size so that barrel 22 will contain about 60 kg. of cemented carbide pieces when it is about three-fourths full. The first approximation of the magnitude of the constant current to be supplied to such apparatus can be scaled up in direct proportion to the weight of the charge of the cemented carbide pieces to be loaded into the barrel of the cell, which at about 0.60 to 0.75 amperes per kg. of pieces would be a constant current of about 35 to 45 amperes.

A summary of electrochemical dissolution data for twelve runs of WC-Co pieces in an apparatus 20 with a barrel eight inches in diameter by twelve inches in length which would accommodate 60 kg. (132 pounds) of cemented carbide pieces is given in Table IV. In each run the electrolyte was 1.2 M $H_3PO_4$ at 60° C. and the WC-Co pieces were of assorted sizes and shapes in the range of about one-quarter to one and one-half inches, but larger pieces that would fit within the barrel could be used. The volume of electrolyte was about 200 gallons, or a total of about 1760 pounds. Thus the ratio by weight of carbide pieces to electrolyte was about 1:13 or 0.075. In runs 3-1 through 3-6, 3-9 and 3-10 the cobalt content of the cemented carbide pieces was nominally 6% and in the remaining runs the cobalt content was nominally 7 to 8%. The same electrolyte was used for each run and was sampled and analyzed by an atomic absorption method to determine the amount of dissolved cobalt and tungsten at the end of each of runs 3-1 through 3-4 and 3-6, and at the end of each second run in the remaining runs 3-7 through 3-12. The percent of disintegration was determined from the decrease in weight of the pieces of cemented carbide.

TABLE IV

Electrolytic Dissolution Experiments on WC-Co Pieces in 60-kg Barrel Dissolution Apparatus With Electrolyte of 1.2 M $H_3PO_4$ at 60° C.

| Exp. No. | Cemented Carbide, kg | Current, Amps | Disintegration per Day, % | Cobalt Dissolved, % | Tungsten Dissolved, % |
|---|---|---|---|---|---|
| 3-1 | 40 | 25 | 24.6 | 5.3 | 0.7 |
| 3-2 | 50 | 31 | 24.4 | 6.0 | .3 |
| 3-3 | 50 | 31 | 21.3 | 5.7 | .8 |
| 3-4 | 50 | 31 | 20.0 | 5.8 | — |
| 3-5 | 62.5 | 40 | 25.1 | not analyzed | |
| 3-6 | 59.3 | 50 | 28.5 | 6.2 | .76 |

TABLE IV-continued

Electrolytic Dissolution Experiments on WC-Co Pieces in 60-kg Barrel Dissolution Apparatus With Electrolyte of 1.2 M $H_3PO_4$ at 60° C.

| Exp. No. | Cemented Carbide, kg | Current, Amps | Disintegration per Day, % | Cobalt Dissoived, % | Tungsten Dissolved, % |
|---|---|---|---|---|---|
| 3-7 | 59.3* | 50 | 20.0 | 6.7 | 3.96 |
| 3-8 | 59.3* | 32 | 16.1 | | |
| 3-9 | 59.3 | 50 | 22.3 | 6.2 | 2.4 |
| 3-10 | 59.3 | 30 | 15.4 | | |
| 3-11 | 59.3* | 50 | 20.8 | 7.9 | .91 |
| 3-12 | 59.3* | 30 | 16.1 | | |

*These charges contained 7–8% Co; all others contained approximately 6% Co.

As previously indicated the magnitude of the the rate of selective dissolution of the binder phase of the cemented carbide pieces without dissolving the tungsten carbide or other metal carbide grains of the pieces. As will be apparent from comparing run 3-6 with run 3-10 and run 3-11 with run 3-12 for the particular size and composition of the cemented carbide pieces, the rate of disintegration can be significantly improved by increasing the constant appied current from about 0.50 to 0.84 amperes per kg. of the charge of cemented carbide in the barrel of the leaching unit.

These runs also demonstrate that the disintegration rate is in part a function of the amount of binder phase in the cemented carbide pieces and that for the same magnitude of applied current the rate of disintegration decreases with increasing amounts of the binder phase. For example, if a 36 ampere current were applied for 24 hours to 60 kg. of WC-Co pieces containing about 8% cobalt, the daily rate of disintegration would be about 10 kg; however, if such pieces contained 16% cobalt, the daily rate of disintegration would be only 5 kg. Therefore, in order to disintegrate WC-Co pieces containing a larger quantity of cobalt binder phase, it is necessary to increase the current sufficiently to dissolve such larger quantity of binder phase at a more rapid rate without attacking the tungsten carbide grains of the pieces.

After being subjected to 23 hours of electrochemical dissolution in the apparatus 20 the cemented carbide pieces were ball milled in distilled water for 24 to 36 hours. The loose powder was removed from the ball mill every 8 to 12 hours, combined with the tungsten carbide powder obtained from the bottom of the tank 24 of apparatus 20, washed five times with distilled water, and dried overnight at 70° C. in trays in a drying oven. The dried powder which had a cake-like consistency, was crushed and rotapped through a 70 mesh screen.

Since the recovered tungsten carbide powder contained some surface oxygen, it was heated in graphite boats for about 4 hours at 950° C. in a reducing atmosphere of 99% hydrogen and 1% methane in a batch type furnace with a flow rate of the reducing atmosphere of 3 CFH per kg. of WC powder. The chemical composition of the recovered tungsten carbide powder is set forth in Table V.

TABLE V

Chemical Composition of WC Powder Recovered From 60-kg Barrel Electrochemical Dissolution Runs Chemical Composition, % by Wt.

| | As Recovered Powder | | | Treated Powder | | | | | | |
|---|---|---|---|---|---|---|---|---|---|---|
| | C | | | C | | | | | | |
| Exp. No. | Total | Free | O | Total | Free | O | P | Ti | Fe | Co |
| 3-1 | 6.06 | 0.02 | 1.03 | 6.12 | 0.02 | n.a. | 0.007 | n.a. | 0.46 | 0.27 |
| 3-2 | 6.04 | .03 | .89 | 6.15 | .03 | 0.13 | .010 | n.a. | .34 | .22 |
| 3-3 | 5.98 | .04 | 1.12 | 6.14 | .03 | .08 | .013 | 0.5 | .52 | .30 |
| 3-4 | n.a. | n.a. | n.a. | 6.12 | .02 | .18 | .033 | .5 | .45 | n.a. |
| 3-5 | n.a. | n.a. | n.a. | 6.01 | .02 | .24 | .023 | n.a. | .45 | n.a. |

Note:
n.a. is not analyzed.

As indicated by these data, such treatment restored the combined carbon content (total carbon minus free carbon) to near the theoretical stoichiometric value of 6.13% carbon in tungsten carbide and substantially decreased the oxygen content. The reclaimed powder also contained some residual cobalt and phosphorus, and also iron from pick-up during processing. The phosphorus content of the recovered tungsten carbide powder can be reduced to 0.001 to 0.002% by washing the powder either before or after milling in an aqueous solution containing about 1% of nitric acid and then further rinsing the powder in deionized or distilled water.

A 120 kg. lot of recovered tungsten carbide powder was prepared by blending aliquots of the recovered powder from the runs in Table IV as well as similar WC powder from other 60-kg. barrel electrochemical dissolution runs. The quality of the reclaimed powder for reuse in producing cemented tungsten carbide was evaluated by using a portion of this powder to produce test pieces of a WC-6%Co grade and a WC-7%Co grade.

In preparing the test pieces of 6% Co grade, a 7-kg. charge comprised of 6.580 kg. of the recovered WC powder, 0.420 kg. of extra fine cobalt metal powder (1.6 μm max. particle size by Fisher subsieve size, per ASTM B330-65 (1970), and 7.0 gm. carbon (lampblack) was milled for 2½ hours in a high energy, attritor mill under acetone, and the milled powder was dried. In preparing test pieces of the 7% Co grade, a 1-kg. charge comprised of 0.930 kg. of the recovered WC powder, 0.070 kg. of the above extra fine cobalt metal powder, and 1.0 gm. carbon (lampblack) was ball milled for 24 hours under acetone and dried. Test pieces of both grades were mechanically pressed, then sintered in a vacuum for 50 min. at 1425° C., in one case using a laboratory furnace, and in a second case using a larger production furnace.

The sintered carbide pieces of both grades were tested for density (per ASTM B311-58 of 1965), hardness (per ASTM B294-64 of 1970), transverse rupture strength [TRS] (per ASTM B406-70), and porosity (per ASTM B276-54 of 1965); and their microstructure was examined. The data from these tests and similar data for comparable grades of cemented tungsten carbide produced from virgin tungsten carbide powder and commercially sold by VR/Wesson Division of Fansteel Inc. of N. Chicago, Ill., are set forth in Table VI. These data show that tungsten carbide recovered by this process may be reused to produce commercially acceptable cemented tungsten carbide pieces.

TABLE VI

Properties of WC-6% Co and WC-7% Co Grade Powders Prepared Using WC Powder Reclaimed by Electrochemical Dissolution

| Properties | WC-6% Co Sintered for 50 min. at 1425° C. | | WC-7% Co Sintered for 50 min. at 1425° C. | | GRADE 2A5* WC-6% Co of VR/Wesson |
|---|---|---|---|---|---|
| | Lab. Furnace | Prod. Furnace | Lab. Furnace | Prod. Furnace | Prod. |
| Density, g/cm$^3$ | 14.73 | 14.76 | — | 14.66 | 14.95 |
| Hardness, Rockwell A | 91.1 | 91.2 | 90.8 | 90.9 | 92.0 |
| TRS, psi | 287,000 | — | — | 303,000 | 270,000 min. |
| Porosity | A2-3 B<1 | A<1 B<1 | A2 | A1 | A2,B1,C2 max. |
| Microstructure | | | Similar to Grade 2A5* | | |

*Commercial designation for a WC-6% Co grade produced by the VR/Wesson Division of Fansteel Inc. This grade has a WC particle size of about 1 μm (per ASTM B390-64 of 1970).

EXAMPLE 4

The rate of disintegration of cemented carbide pieces can be increased by bloating the pieces as disclosed in expired U.S. Pat. No. 2,485,175. A quantity of 4 to 5 kg. of nominally WC-6% Co cemented carbide pieces ranging from about one-quarter to three-quarters of an inch in size were bloated by heating the pieces in a graphite crucible under an argon atmosphere for 20 minutes at 2000°–2100° C. and then cooling the pieces to an ambient temperature. Such bloated carbide pieces were subjected to electrochemical dissolution in an apparatus 20 operated under essentially the same conditions as those described in Example 1 with an electrolyte of 1.2 M H$_3$PO$_4$ at approximately 50° C. As shown by the data in Table VII bloating the cemented carbide pieces substantially increases the rate of dissolution compared to that of the unbloated carbide pieces of Example 1.

TABLE VIII

Electrolytic Dissolution Experiments on Bloated WC-6% Co in Barrel with Electrolyte of 1.2 M H$_3$PO$_4$ at 50° C. (4 kg scrap)

| Exp. No. | Duration of Exp., hr | Disintegration % | Cobalt Leached, % | Tungsten Leached, % |
|---|---|---|---|---|
| 4-1 | 23 | 54.9 | 6.3 | 0.22 |
| 4-2 | 44 | 65.8 | 7.5 | .39 |

EXAMPLE 5

The rate of disintegration of cemented carbide pieces can also be increased by crushing or otherwise breaking the carbide pieces into smaller particles. For example, a quantity of nominal WC-6% Co pieces of various sizes were mechanically crushed and screened to obtain −10+14 mesh (U.S. standard sieve designation) crushed pieces. Since these pieces were too fine to be subjected to electrochemical dissolution in barrel apparatus 20, the electrochemical dissolution was carried out in a vertical cell 50 shown in FIG. 5 which can also be used for dissolution of uncrushed cemented carbide pieces if desired.

Figure 5:
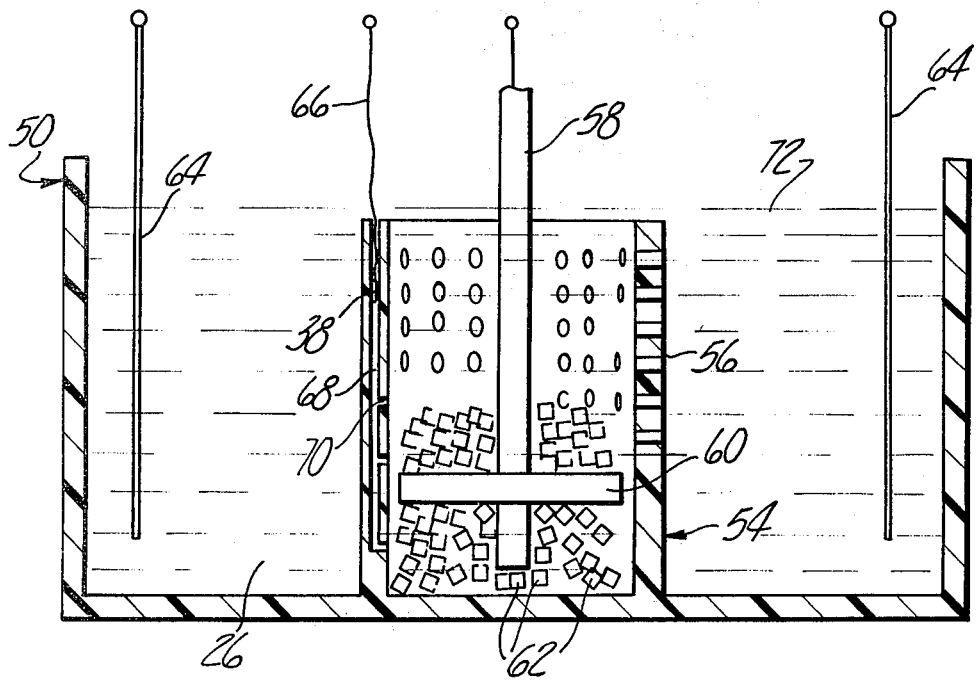
FIG. 5 is a semi-schematic sectional view of a vertical cell apparatus for electrochemical dissolution of cemented carbides in accordance with this invention.

As shown in FIG. 5, vertical cell 50 has an outer electrolyte tank 52 of polyethylene with an annular wall 54 therein of a nonconductive corrosion resistant material such as nylon defining an anode compartment and having perforations 56 therethrough to permit the electrolyte 26 to communicate with the anode compartment. A vertically extending anode 58 of stainless steel with a cross bar extension 60 adjacent its lower end is received in the anode compartment to provide electrical contact with crushed pieces of cemented carbide 62 and in operation may be rotated to stir the carbide pieces. A generally annular cathode 64 of stainless steel is received in tank 52 and a saturated calomel reference electrode 66 communicates with the anode compartment proximate the cemented carbide pieces 62 through passages 68 and 70. The electrolyte 26 is filled to a level 72 sufficient to submerge the crushed cemented carbide pieces 62.

As with the barrel type apparatus 20 electrode potentials measured in the vertical cell 50 are average potentials of the particular cemented carbide pieces when the anode 58 is being rotated. If the anode is stationary, pieces next to the anode can be essentially continuously at a higher electrode potential than pieces adjacent the cell wall and hence the pieces at the higher potential are more susceptible to loss of tungsten into solution. However, it is possible to operate the cell 50 with the cemented carbide pieces being stationary or static by adjusting the applied electrode potential so that the pieces next to the anode are not subjected to a high enough electrode potential to produce appreciable dissolution of the tungsten carbide.

The following Table VIII sets forth the results of electrochemical dissolution of crushed cemented carbide pieces with a constant applied potential when the cell 50 is operated with the anode 58 in both the stationary and rotating modes. Similarly, Table IX sets forth the results of electrochemical dissolution in the vertical cell 50 of crushed cemented carbide pieces under constant current conditions with the anode being rotated. In the runs of Table VIII the current density, duration of the run, speed of rotation of the anode, and solution temperature were varied in order to determine the effect of each parameter separately. The total ampere hours per kg. of crushed cemented carbide of current passed in each of these runs are kept constant by adjusting the total time of each run.

TABLE VIII

Electrochemical Dissolution of −10 +14 Mesh
Crushed WC-6% Co in Vertical Cell Operated
Without and With Anode Rotation Under Controlled
Potential and Electrolyte of 1.2 M $H_3PO_4$

| Exp. No. | Mode of Operation | Weight of −10 +14 Mesh Crushed Material, kg | Disintegration Per Day, % | Cobalt Leached, % | Tungsten Leached, % |
|---|---|---|---|---|---|
| 5-1 | Stationary Anode* | 1.0 | 67.3 | 5.72 | 4.4 |
| 5-2 | Stationary Anode* | .5 | 70.1 | 5.84 | 5.3 |
| 5-3 | Stationary Anode* | 1.0 | 80.0 | 5.96 | 4.7 |
| 5-4 | Stationary Anode* | .67 | 94.0 | 8.0 | 10.5 |
| 5-5 | Rotating 6 RPM Anode** | 1.0 | 72 | 4.6 | .7 |
| 5-6 | Rotating 6 RPM Anode** | 1.0 | 55 | 3.6 | .6 |

*The solution temperature was raised to about 60° C. from the heat of reaction.
**The solution temperature stayed at about 30° C.

TABLE IX

Electrochemical Dissolution of 0.8 Kg of −10 +14 Mesh
Crushed WC-6% in Vertical Cell Operated Under
Constant Current and Electrolyte of 1.2 M $H_3PO_4$

| Exp. No. | Anode Rotation rpm | Current,* Amps | Temperature, °C. | Disintegration/Day, % | Cobalt Leached, % | Tungsten Leached, % |
|---|---|---|---|---|---|---|
| 5-7 | 6 | 3.6 | 25 | 89.6 | 6.0 | 1.9 |
| 5-8 | 6 | 2.8 | 25 | 85.0 | 7.1 | 1.4 |
| 5-9 | 12 | 3.6 | 25 | 93.0 | 5.5 | 2.6 |
| 5-10 | 12 | 2.8 | 25 | 90.0 | 5.6 | 1.4 |
| 5-11 | 6 | 3.6 | 50 | 91.6 | 5.9 | 1.7 |
| 5-12 | 6 | 2.4 | 50 | 92.8 | 6.0 | 2.3 |
| 5-13 | 12 | 3.6 | 47 | 100.0 | 6.1 | 2.6 |
| 5-14 | 12 | 2.8 | 45 | 86.9 | 5.9 | 1.8 |

*currents recorded were set initially. A decrease in current was observed during the runs.

The data of both Tables VIII and IX shows that higher rates of disintegration can be obtained by utilizing finer or smaller pieces of cemented carbide. Comparison of the data of Table VIII with that of Table IX also shows that higher temperature, higher rotational speed of the anode and lower initial setting of the amperes of constant current supplied to the cell 50 produce a higher rate of dissolution of the binder phase with less dissolution of the tungsten from the metal carbide grains.

EXAMPLE 6

Tungsten carbide grains have been recovered from nominally WC-6% Co cemented carbide pieces ranging in size from about one-quarter to three-quarters of an inch in accordance with this invention utilizing as an electrolyte an aqueous solution of 10% acetic acid by weight and 0.5% sodium acetate by weight. The sodium acetate is added to make the acetic acid solution adequately conductive to function as an electrolyte. Other soluble acetate salts such as ammonium acetate and potassium acetate can be used for this purpose. The process was carried out in essentially the same manner as Example 2 utilizing apparatus 20 with a constant current of 4 amperes supplied for twenty-four hours during each run with the electrolyte maintained at 55° to 60° C. The results of two of these runs are set forth in Table X and are generally similar to those observed in Example 2, which used an aqueous solution of phosphoric acid as an electrolyte.

TABLE X

Disintegration Rates of WC-6% Co Cemented Carbide Pieces
in Barrel-Type Apparatus Using Constant Current and
Electrolyte of 10% Acetic Acid - 0.5% Sodium Acetate -
Balance Water at 55°–60° C.

| Exp. No. | Weight of Cemented Carbide, kg | Current, amps | Disintegration Per Day, % | Cobalt Leached, % | Tungsten Leached, % |
|---|---|---|---|---|---|
| 6-1 | 5.0 | 4.0 | 26.0 | 5.5 | 2.1 |
| 6-2 | 5.0 | 4.0 | 24.7 | 6.2 | 1.5 |

EXAMPLE 7

While the process of the invention has been described primarily in connection with the recovery of tungsten carbide powder from cemented tungsten carbide pieces with cobalt binder, the process may be used to recover any refractory or reactive metal carbide from pieces of cemented carbide with a binder of any iron group metal. For example, this process has been used to recover carbide powder from cemented carbide pieces of WC-TiC-TaC-Co with 6 to 8% Co and ranging in size from about one-quarter to three-quarters of an inch, using apparatus 20 and an electrolyte of 1.2 M $H_3PO_4$ at 60° C. WC-TiC-TaC powders were recovered from 4 kg. lots of such cemented carbide pieces which were subjected to electrochemical dissolution under both constant potential conditions essentially the same as those of Example 1 and constant current conditions essentially the same as those of Example 2. Disintegration data for such cemented carbide pieces are set forth in Table XI and show that a good rate of disintegration is achieved by this process and that the dissolution is essentially of only the cobalt binder phase. Chemical analyses of both the electrolytes and such recovered carbide powder shows that the TiC and TaC components remain associated with the recovered carbide powder.

TABLE XI

Electrochemical Dissolution of WC-TiC-TaC-Co in Barrel Apparatus Using Either Constant Current or Constant Potential and an Electrolyte of 1.2 M $H_3PO_4$ at 60° C.

| Exp. No. | Weight of Cemented Carbide, kg | Constant Potential or Current | Disintegration Per Day, % | Cobalt Leached, % | Tungsten Leached, % |
|---|---|---|---|---|---|
| 7-1 | 4 | 3 amperes | 17.3 | 8.6 | 1.5 |
| 7-2 | 4 | 4 amperes | 23.5 | 7.8 | .4 |
| 7-3 | 4 | Potential of +400 mV. (vs SCE) | 18.25 | 9.7 | 1.1 |
| 7-4 | 4 | Potential of +560 mV. (vs SCE) | 21.5 | 6.7 | Below Detection |

Figure 6:
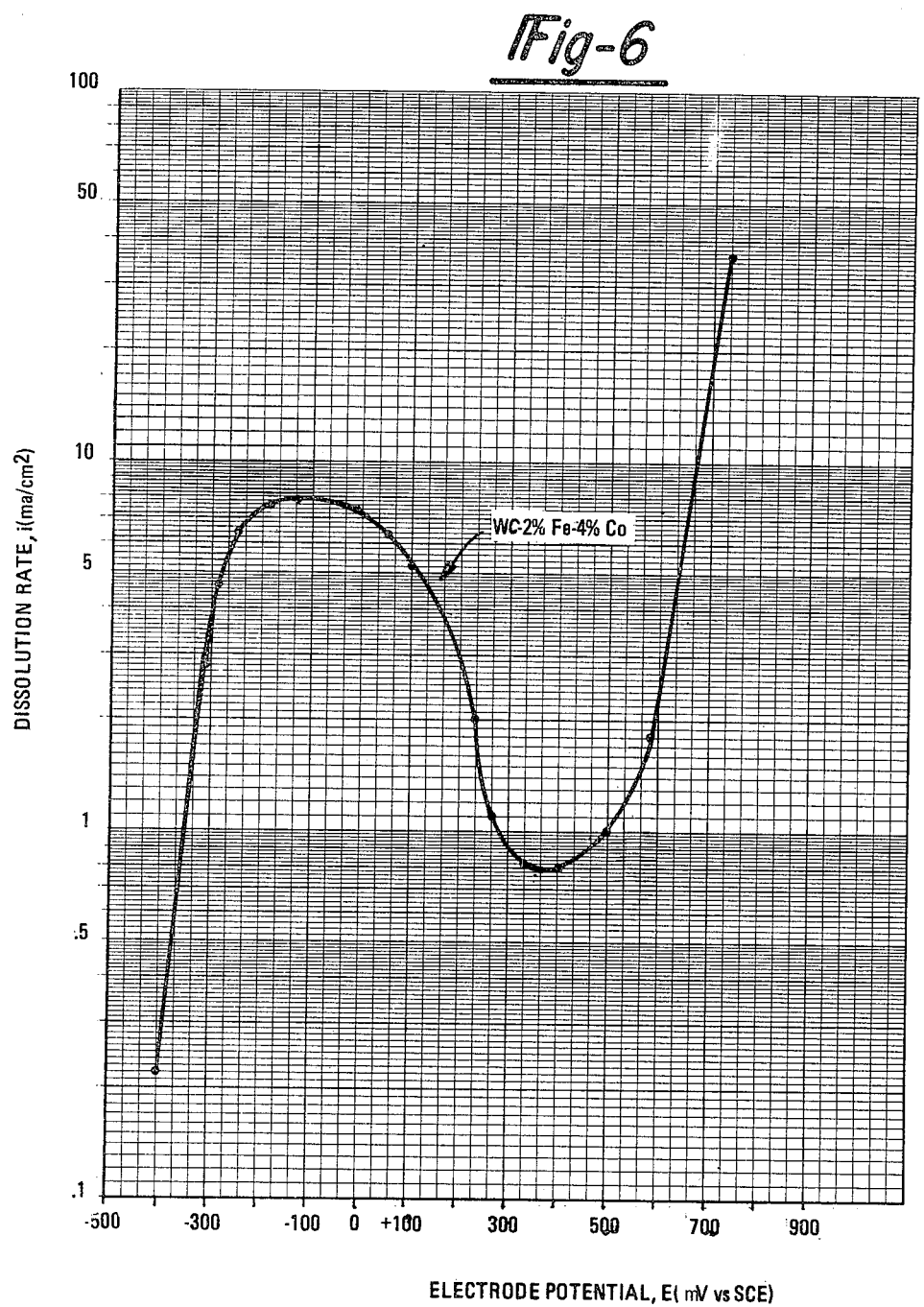
FIG. 6 is a plot of dissolution rate versus applied potential for a one cm$^2$ area of a WC-2%Fe-4%Co anode in nitrogen saturated 1.2 M phosphoric acid at 25° C.

FIG. 6 is a plot of the rate of dissolution versus applied electrode potential (in millivolts relative to an SCE electrode) for electrochemical dissolution in a 1.2 M $H_3PO_4$ electrolyte at 60° C. of an anode of cemented tungsten carbide with a binder of 2% iron and 4% cobalt. As shown in FIG. 6 the rate of selective dissolution of the iron-cobalt binder phase of the anode occurred in Region I at an increasing rate as electrode potential increased from about −400 to −200 mV. with respect to a SEC reference electrode, and in intermediate Region II decreased as the potential is further increased to about +350 mV. In Region III of FIG. 6 the rate of dissolution begins to again increase as the electrode potential is further increased beyond about +400 mV. with reference to the SCE which corresponds to dissolution of both the binder phase and the tungsten carbide grains. Hence, the behavior of cemented tungsten carbide with a binder of iron and cobalt is similar to that of cemented tungsten carbide with a cobalt binder. Thus, it is believed that the process of this invention may be utilized to recover for reuse tungsten carbide powder from cemented tungsten carbide with an iron and cobalt binder.

The data for the plot of FIG. 6 was developed with essentially the same cell and under essentially the same conditions as the data for the plot of FIG. 3. The cell in which the cemented WC-2% Fe-4% Co anode was placed had a platinum cathode, an SCE reference electrode, an agitator of the electrolyte, and was nitrogen saturated. The cemented carbide anode was prepared by compacting and sintering a mixture of powders comprised of 4% of extra fine cobalt metal powder (1.6 micrometer max. particle size by Fisher sub-sieve size), 2% iron metal powder (−250+325 mesh particle size), and 94% tungsten carbide (nominally 1 micrometer particle size).

Figure 7:
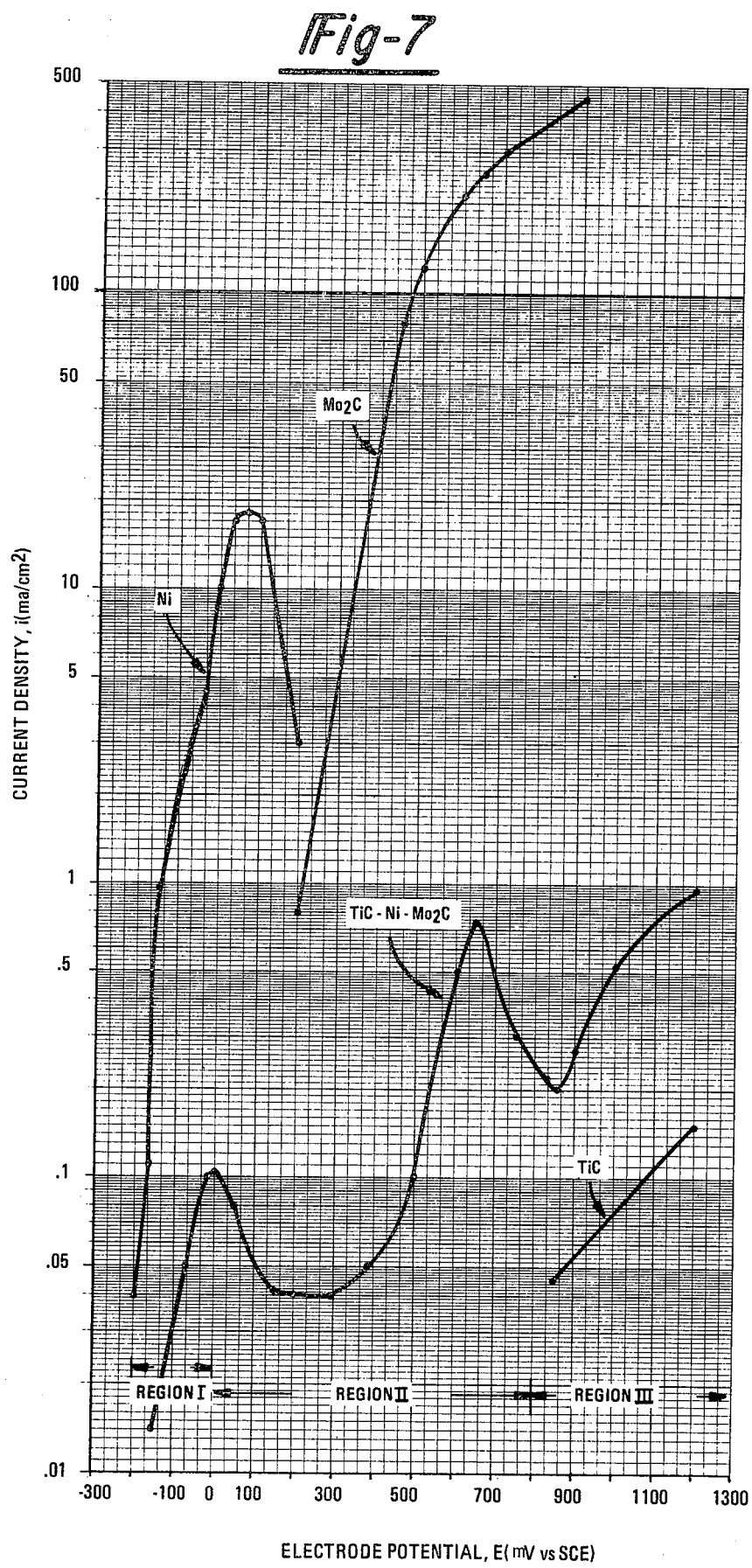
FIG. 7 is a plot of dissolution rate versus applied potential for a one cm$^2$ area of a nickel anode, a Mo$_2$C anode, a TiC-Ni-Mo$_2$C anode, and a TiC anode in nitrogen saturated 1.2 M phosphoric acid at 25° C.

FIG. 7 shows a similar plot of dissolution rate versus applied potential for an anode of nickel, an anode of molybdenum carbide, an anode of titanium carbide, and an anode of TiC-12% Ni-$Mo_2C$ cemented carbide. The plot of FIG. 7 for the cemented carbide anode of TiC-Ni-$Mo_2C$ shows that in Region I the current density or rate of binder phase dissolution increases as the electrode potential increases to about −20 mV. with reference to an SCE. In Region II the current density first decreases as the electrode potential further increases to about +200 mV., then increases as the electrode potential further increases to about +650 mV., and then decreases again as the potential further increases to about +800 mV. with reference to an SCE which is believed to be due to dissolution of both the nickel binder phase and the $Mo_2C$ powder of the cemented carbide anode.

In Region III of FIG. 7 the current density again increases as the electrode potential further increases above +800 mV. with respect to the SCE, generally parallels the curve for the TiC anode, and is believed to be due to the dissolution of TiC. In Region I the behavior of the TiC-Ni-$Mo_2C$ cemented carbide anode is essentially the same as that of Region I of the cemented tungsten carbide anode with a cobalt binder of FIG. 1, and hence it is believed that the process of this invention may be utilized to recover for reuse various metallic carbides from cemented carbide pieces having a nickel phase binder.

The data for the plot of FIG. 7 was developed with essentially the same cell and under essentially the same conditions as the data for the plots of FIGS. 3 and 6. The cemented carbide anode was prepared by compacting and sintering a mixture of powders comprised of 12% nickel metal powder (1.6 μm according to Fisher sub-sieve size), 18% $Mo_2C$ powder (2.5–3.5 μm particle size), and 70% TiC powder (4.0 μm max. particle size).

The three region dissolution behavior of the cemented carbide of FIG. 7 can be observed whenever the cemented carbide contains at least two different types of metal carbide grains having widely separated regions of electrochemical dissolution. Hence, such behavior occurs when one metal carbide is $Mo_2C$ and the other is TiC or when one metal carbide is WC and the other is TaC or TiC. If desired, with such cemented carbide pieces the operating potential or amperage at which electrochemical dissolution occurs can be selected and adjusted to simultaneously dissolve both the binder phase and the less corrosion resistant of the two types of carbide grains so as to recover the relatively unattached grains of the more corrosion resistant carbide. The operating potential or amperage at which such electrochemical dissolution occurs is significantly greater than that at which electrochemical dissolution of only the binder phase occurs as in the preceding examples.

Also, the potentials at which significant electrochemical dissolution of iron group binder phases such as Co, Fe, and Ni of cemented carbides differ sufficiently from that of refractory and reactive metal carbides such as $Mo_2C$, TaC, WC and TiC that they can be readily and economically recovered by the process of this invention for reuse in producing cemented carbides.

I claim:

1. A process for recovering metal carbide powder from cemented carbide comprising metal carbide grains and a binder phase, such process comprising submerging a plurality of pieces of cemented carbide in a conductive aqueous electrolyte having an anode and a cathode therein, said electrolyte comprising a corrosive agent which in the absence of an applied electrolytic current will corrode and dissolve the binder phase of the cemented carbide pieces while having little if any corrosive effect on the metal carbide grains of such pieces, maintaining at least some of said cemented carbide pieces in contact with said anode, passing an electric current between said anode and cathode, controlling at least one of the amperage and potential of said electric current to electrochemically and selectively dissolve at least a portion of the binder phase of said cemented carbide pieces without significant dissolution of the metal carbide grains of said cemented carbide pieces, and recovering metal carbide grains from which the binder phase has been dissolved.

2. The process of claim 1 which also comprises essentially continuously changing the position of at least some of said cemented carbide pieces relative to each other while maintaining at least some of said cemented carbide pieces in contact with the anode essentially throughout the electrochemical and selective dissolution of the binder phase of said cemented carbide pieces.

3. The process of claim 1 which also comprises performing the electrochemical and selective dissolution of said binder phase of said cemented carbide pieces in an inert atmosphere and without any oxidizing agent in the electrolyte.

4. The process of claim 1 which also comprises maintaining the temperature of said electrolyte in the range of about 25° to 60° C. essentially throughout the electrochemical and selective dissolution of said binder phase of said cemented carbide pieces.

5. The process of claim 1 wherein said cemented carbide pieces on the average have an initial maximum lineal dimension not greater than about 1.5 inches.

6. The process of claim 1 wherein said cemented carbide pieces on the average have an initial maximum lineal dimension in the range of about one-quarter to three-quarters of an inch.

7. The process of claim 1 wherein said binder phase is selected from the group consisting essentially of cobalt, iron and nickel.

8. The process of claim 1 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

9. The process of claim 1 wherein said electrolyte comprises an aqueous solution containing about 10% acetic acid and 0.5% of a soluble acetate salt.

10. The process of claim 1 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

11. The process of claim 1 wherein prior to being subjected to electrochemical dissolution, said plurality of metal carbide pieces are crushed to smaller pieces.

12. The process of claim 1 wherein prior to being subjected to electrochemical dissolution, said plurality of metal carbide pieces are crushed to pass through a 10 mesh screen (U.S. Standard Sieve designation).

13. A process for recovering metal carbide powder from cemented carbide comprising metal carbide grains and a binder phase, such process comprising submerging a plurality of pieces of cemented carbide in a conductive aqueous electrolyte having an anode and a cathode therein, said electrolyte comprises at least 2% concentration by weight of a corrosive agent which in the absence of an applied electrolytic current will corrode and dissolve the binder phase of the cemented carbide pieces while having little if any corrosive effect on the metal carbide grains of such pieces, said corrosive agent being selected from the group consisting essentially of phosphoric acid, acetic acid plus a soluble acetate salt, citric acid plus a soluble citrate salt, tartaric acid, hydrochloric acid, oxalic acid, carbonates, borates, and sulfuric acid, maintaining at least some of said cemented carbide pieces in contact with said anode, passing an electric current between said anode and cathode, controlling at least one of the amperage and potential of said electric current to electrochemically and selectively dissolve at least a portion of the binder phase of said cemented carbide pieces without significant dissolution of the metal carbide grains of said cemented carbide pieces, and recovering metal carbide grains from which the binder phase has been dissolved.

14. The process of claim 13 which also comprises essentially continuously changing the position of at least some of said cemented carbide pieces relative to each other while maintaining at least some of such cemented carbide pieces in contact with said anode essentially throughout the electrochemical and selective dissolution of said binder phase of said cemented carbide pieces.

15. The process of claim 13 wherein prior to being subjected to electrochemical dissolution, said plurality of metal carbide pieces are crushed to smaller pieces.

16. The process of claim 13 wherein prior to being subjected to electrochemical dissolution, said plurality of metal carbide pieces are crushed to pass through a 10 mesh screen (U.S. Standard Sieve designation).

17. The process of claim 13 wherein said cemented carbide is selected from the group consisting essentially of WC-Co, WC-TiC-TaC-Co, WC-TaC-Co, WC-TaC-Co, WC-TiC-Co, TiC-Ni, TiC-Ni-Mo, TiC-Ni-Mo$_2$C, WC-Co-Ni, and WC-Co-Fe.

18. A process for recovering metal carbide powder from cemented carbide comprising metal carbide grains and a binder phase, such process comprising submerging a plurality of pieces of cemented carbide in a conductive aqueous electrolyte having an anode and a cathode therein, said electrolyte comprises phosphoric acid at a concentration of about 1.2 M, maintaining at least some of said cemented carbide pieces in contact with said anode, passing an electric current between said anode and cathode, controlling at least one of the amperage and potential of said electric current to electrochemically and selectively dissolve at least a portion of the binder phase of said cemented carbide pieces without significant dissolution of the metal carbide grains of said cemented carbide pieces, and recovering metal carbide grains from which the binder phase has been dissolved.

19. The process of claim 18 which also comprises maintaining the temperature of said 1.2 M phosphoric acid electrolyte in the range of about 25° to 60° C. essentially throughout the electrochemical and selective dissolution of said binder phase of said cemented carbide pieces.

20. The process of claim 18 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

21. A process for recovering metal carbide powder from cemented carbide comprising metal carbide grains and a binder phase, such process comprising submerging a plurality of pieces of cemented carbide in a conductive aqueous electrolyte having an anode and a cathode therein, said electrolyte comprising a corrosive agent which in the absence of an applied electrolytic current will corrode and dissolve the binder phase of the cemented carbide pieces while having little if any corrosive effect on the metal carbide grains of such pieces, maintaining at least some of said cemented carbide pieces in contact with said anode, passing an electric current between said anode and cathode, controlling at least one of the amperage and potential of said electric current to electrochemically and selectively dissolve at least a portion of the binder phase of said cemented carbide pieces without significant dissolution of the metal carbide grains of said cemented carbide pieces, said cemented carbide pieces being subjected to a first run of electrochemical and selective dissolution which dissolves said binder phase from only a portion of said cemented carbide pieces to produce an outer layer of tungsten carbide grains from which said binder has been dissolved which surrounds the core of said cemented carbide pieces, said cemented carbide pieces from said first run being tumbled to separate at least a portion of said carbide grains in the outer layer from the cores of said cemented carbide pieces, and the remaining cores of said cemented carbide pieces being subjected to a second run of electrochemical and selective dissolution of said binder phase thereof.

22. The process of claim 20 which also comprises essentially continuously changing the position of at least some of said cemented carbide pieces relative to each other while maintaining at least some of said cemented carbide pieces in contact with said anode essentially throughout the electrochemical and selective dissolution of said binder phase of said cemented carbide pieces.

23. The process of claim 20 which also comprises maintaining the temperature of said electrolyte in the range of about 25° to 60° C. essentially throughout the electrochemical and selective dissolution of said binder phase of said cemented carbide pieces.

24. The process of claim 20 which also comprises performing the electrochemical and selective dissolution of said binder phase of said cemented carbide pieces in an inert atmosphere and without any oxidizing agent in said electrolyte.

25. The process of claim 20 wherein each of said first and second runs of electrochemical dissolution during which said electric current is being passed and controlled is in the range of about 18 to 30 hours.

26. The process of claim 25 wherein said cemented carbide pieces from said first run are tumbled for a period of time in the range of 18 to 36 hours to separate at least some of said metal carbide grains from which the binder has been dissolved of the outer layer from the cores of said cemented carbide pieces, and said metal carbide grains which have separated from said cemented carbide pieces are removed about every 4 to 10 hours during each period of tumbling so that they are no longer subjected to tumbling with said cemented carbide pieces.

27. The process of claim 26 which also comprises tumbling said cemented carbide pieces while maintaining at least some of said cemented carbide pieces in contact with said anode essentially continuously throughout the electrochemical and selective dissolution of said binder phase of said cemented carbide pieces.

28. The process of claim 26 which also comprises maintaining the temperature of said electrolyte in the range of about 25° to 60° C. essentially throughout the electrochemical and selective dissolution of said binder phase of said cemented carbide pieces.

29. The process of claim 21 wherein said cemented carbide pieces on the average have an initial maximum lineal dimension not greater than about 1.5 inches.

30. The process of claim 21 wherein said cemented carbide pieces on the average have an initial maximum lineal dimension in the range of about one-quarter to three-quarters of an inch.

31. The process of claim 21 wherein said binder phase is selected from the group consisting essentially of cobalt, iron nickel.

32. The process of claim 21 wherein said electrolyte comprises an acid selected from the group consisting essentially of phosphoric acid, acetic acid plus a soluble acetate salt, citric acid plus a soluble citrate salt, tartaric acid, hydrochloric acid and sulfuric acid.

33. The process of claim 21 wherein said electrolyte comprises an aqueous solution containing about 10% acetic acid and 0.5% of a soluble acetate salt.

34. The process of claim 21 wherein said electrolyte comprises phosphoric acid at a concentration of about 1.2 M.

35. The process of claim 21 which also comprises maintaining the temperature of said 1.2 M phosphoric acid electrolyte in the range of about 25° to 60° C. essentially throughout the electrochemical and selective dissolution of said binder phase of said cemented carbide pieces.

36. The process of claim 21 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

37. A process for recovering metal carbide powder and a binder phase metal from cemented carbide pieces wherein a plurality of pieces of cemented carbide are placed in an electrolytic apparatus containing an aqueous conductive electrolyte, an anode and a cathode and wherein at least some of said cemented carbide pieces are in contact with said anode, said electrolyte comprising a corrosive agent which in the absence of an applied electrolytic current will corrode and dissolve the binder phase of the cemented carbide pieces while having little if any corrosive effect on the metal carbide grains of such pieces, passing an electric current between said anode and cathode, at least one of the amperage and potential of said electric current being controlled to electrochemically and selectively dissolve the binder phase of said cemented carbide pieces without significantly attacking the metal carbide grains therein, recovering metal carbide grains from which said binder phase has been dissolved, and recovering a metallic value from said dissolved binder phase by precipitation as a compound from said electrolyte.

38. The process of claim 37 wherein said binder phase is selected from the group consisting essentially of cobalt, iron and nickel.

39. The process of claim 37 wherein said compound is selected from the group consisting essentially of cobalt oxalate, cobalt carbonate and cobalt hydroxide.

40. The process of claim 39 wherein said compound is reduced in a hydrogen atmosphere at a temperature of at least 600° C. to essentially cobalt metal.

41. The process of claim 37 wherein prior to being subjected to electrochemical dissolution, said plurality of metal carbide pieces are crushed to smaller pieces.

42. The process of claim 37 wherein prior to being subjected to electrochemical dissolution, said plurality of metal carbide pieces are crushed to pass through a 10 mesh screen (U.S. Standard Sieve designation).

43. The process of claim 37 wherein said cemented carbide is selected from the group consisting essentially of Wc-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

44. A process for recovering metal carbide powder and a binder phase metal from cemented carbide pieces wherein a plurality of pieces of cemented carbide are placed in an electrolytic apparatus containing an aqueous conductive electrolyte, an anode and a cathode and wherein at least some of said cemented carbide pieces are in contact with said anode, said electrolyte comprising a corrosive agent which in the absence of an applied electrolytic current will corrode and dissolve the binder phase of the cemented carbide pieces while having little if any corrosive effect on the metal carbide grains of such pieces, passing an electric current between said anode and cathode, at least one of the amperage and potential of said electric current being controlled to electrochemically and selectively dissolve the binder phase of said cemented carbide pieces without significantly attacking the metal carbide grains therein, recovering metal carbide grains from which said binder phase has been dissolved, and recovering a metallic value from said dissolved binder phase by precipitation as a compound from said electrolyte, said binder phase being essentially cobalt and said compound being essentially a cobalt salt.

45. The process of claim 44 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

46. A process for recovering metal carbide powder and a binder phase metal from cemented carbide pieces wherein a plurality of cemented carbide pieces are placed in an electrolytic apparatus containing an aqueous conductive electrolyte, an anode and a cathode and wherein at least some of said cemented carbide pieces are in contact with said anode, said electrolyte comprising a corrosive agent which in the absence of an applied electrolytic current will corrode and dissolve the binder phase of the cemented carbide pieces while having little if any corrosive effect on the metal carbide grains of such pieces, passing an electric current between said anode and cathode, at least one of the amperage and potential of said electric current being controlled to electrochemically and selectively dissolve said binder phase of said cemented carbide pieces without significantly attacking said metal carbide grains therein, recovering metal carbide grains from which said binder phase has been dissolved, and recovering metal values from said dissolved binder phase by electroplating said metal values from said electrolyte onto a cathode.

47. The process of claim 46 wherein prior to being subjected to electrochemical dissolution said plurality of metal carbide pieces are crushed to pass through a 10 mesh screen (U.S. standard sieve designation).

48. The process of claim 46 wherein prior to being subjected to electrochemical dissolution, said plurality of metal carbide pieces are crushed to smaller pieces.

49. The process of claim 46 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni, and WC-Co-Fe.

50. A process for recovering metal carbide powder and a binder phase metal from cemented carbide pieces wherein a plurality of cemented carbide pieces are placed in an electrolytic apparatus containing an aqueous conductive electrolyte, an anode and a cathode and wherein at least some of said cemented carbide pieces are in contact with said anode, said electrolyte comprising a corrosive agent which in the absence of an applied electrolytic current will corrode and dissolve the binder phase of the cemented carbide pieces while having little if any corrosive effect on the metal carbide grains of such pieces, passing an electric current between said anode and cathode, at least one of the amperage and potential of said electric current being controlled to electrochemically and selectively dissolve said binder phase of said cemented carbide pieces without significantly attacking said metal carbide grains therein, recovering metal carbide grains from which said binder phase has been dissolved, and recovering metal values from said dissolved binder phase by electroplating said metal values from said electrolyte onto a cathode, said cemented carbide pieces comprising cemented tungsten carbide pieces with a binder phase containing cobalt and said metal values comprising cobalt and tungsten.

51. The process of claim 50 wherein said cemented carbide is selected from the group consisting essentially of WC-Co, WC-TiC-TaC-Co, WC-TaC-Co, WC-TiC-Co, TiC-Ni, TiC-Ni-Mo, TiC-Ni-Mo$_2$C, WC-Co-Ni and WC-Co-Fe.

52. A process for recovering metal carbide powder from cemented carbide wherein a plurality of cemented carbide pieces are placed in an electrolytic cell containing an oxalic acid electrolyte, an anode and a cathode and wherein at least some of said cemented carbide pieces are in contact with said anode, passing an electric current between said anode and cathode, at least one of the amperage and potential of said current being controlled to electrochemically and selectively dissolve the binder phase of said cemented carbide pieces without significantly attacking the metal carbide grains therein, and recovering at least a portion of said metal carbide grains from which said binder phase has been dissolved along with cobalt oxalate.

53. A process for recovering metal carbide powder from a cemented carbide containing a binder phase, first metal carbide grains having an active anodic polarization at a higher positive potential than said binder phase, and second metal carbide grains having an active anodic polarization at a higher positive potential than said first metal carbide grains, such process comprising placing a plurality of said cemented carbide pieces in an electrolytic apparatus containing an aqueous conductive electrolyte, an anode and a cathode and wherein at least some of said cemented carbide pieces are in contact with said anode, passing an electric current between said anode and cathode, at least one of the amperage and potential of said electric current being controlled to electrochemically and selectively dissolve said binder phase and said first metal carbide grains of said cemented carbide pieces without significantly attacking said second metal carbide grains therein, and recovering at least a portion of said second metal carbide grains from which said binder phase and said first metal carbide grains have been dissolved.

54. The process of claim 53 wherein said binder phase comprises nickel, said first metal carbide grains are essentially molybdenum carbide, and said second metal carbide grains are essentially titanium carbide.

55. The process of claim 53 wherein said binder phase comprises cobalt, said first metal carbide grains are essentially tungsten carbide and said second metal carbide grains are essentially tantalum carbide, titanium carbide, or both.

56. The process of any one of claims 18, 21, 44, 50, 52 and 53 wherein prior to being subjected to electrochemical dissolution said plurality of metal carbide pieces are crushed to smaller pieces.

57. The process of any one of claims 18, 21, 44, 50, 52 and 53 wherein prior to being subjected to electrochemical dissolution said plurality of metal carbide pieces are crushed to pass through a 10 mesh screen (U.S. standard sieve designation).

* * * * *

UNITED STATES PATENT AND TRADEMARK OFFICE
CERTIFICATE OF CORRECTION

PATENT NO. : 4,234,333
DATED : November 18, 1980
INVENTOR(S) : Mohammad H. Ghandehari and Mortimer Schussler It is certified that error appears in the above-identified patent and that said Letters Patent are hereby corrected as shown below:

Column 25, Line 24, change "20" to -- 21 --.

Column 25, Line 32, change "20" to -- 21 --.

Column 25, Line 37, change "20" to -- 21 --.

Column 25, Line 42, change "20" to -- 21 --.

Column 26, Line 22, change "21" to -- 34 --.

Signed and Sealed this

Twenty-fourth Day of March 1981

[SEAL]

Attest:

RENE D. TEGTMEYER

Attesting Officer   Acting Commissioner of Patents and Trademarks